US010670714B2

(12) United States Patent
Fujita et al.

(10) Patent No.: US 10,670,714 B2
(45) Date of Patent: Jun. 2, 2020

(54) VEHICLE OUTSIDE SENSOR UNIT

(71) Applicant: HONDA MOTOR CO., LTD., Minato-ku, Tokyo (JP)

(72) Inventors: Akira Fujita, Wako (JP); Takato Watanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/242,050

(22) Filed: Jan. 8, 2019

(65) Prior Publication Data

US 2019/0219689 A1 Jul. 18, 2019

(30) Foreign Application Priority Data

Jan. 18, 2018 (JP) .................. 2018-006333

(51) Int. Cl.
*B60R 11/00* (2006.01)
*G01S 13/931* (2020.01)
(Continued)

(52) U.S. Cl.
CPC ............ *G01S 13/931* (2013.01); *B60R 11/00* (2013.01); *B60R 19/483* (2013.01); *G01S 7/40* (2013.01);
(Continued)

(58) Field of Classification Search
CPC .......... G01S 13/931; G01S 7/40; G01S 17/06; B60R 11/00
See application file for complete search history.

(56) References Cited

U.S. PATENT DOCUMENTS 7,398,704 B2 * 7/2008 Loscher .................. G01P 1/026
73/866.5
7,624,655 B2 * 12/2009 Ueda ........................ B62J 11/00
73/866.5
(Continued)

FOREIGN PATENT DOCUMENTS

JP     63-163600      10/1988
JP     09-113607       5/1997
(Continued)

OTHER PUBLICATIONS

Japanese Office Action for Japanese Patent Application No. 2018-006333 dated Jul. 9, 2019.
(Continued)

*Primary Examiner* — Jamel E Williams
(74) *Attorney, Agent, or Firm* — Amin, Turocy & Watson, LLP

(57) ABSTRACT

An outside sensor unit includes an outside sensor, a main bracket, a support bracket, and a cover member. The main bracket is attached to a vehicle body. The support bracket supports the outside sensor and is attached to the main bracket rotatably adjustably. The cover member covers an outer circumference in an outside detection direction of the outside sensor. The main bracket has a base wall that is attached to the support bracket rotatably adjustably and an attachment seat that is arranged at a position which is offset in the outside detection direction of the outside sensor with respect to the base wall. The cover member is attached to the attachment seat.

5 Claims, 6 Drawing Sheets

(51) Int. Cl.
    *G01S 17/06*     (2006.01)
    *G01S 7/40*     (2006.01)
    *B60R 19/48*     (2006.01)
    *G01S 7/02*     (2006.01)
    *G01S 17/931*     (2020.01)

(52) U.S. Cl.
    CPC ............ *G01S 17/06* (2013.01); *G01S 17/931* (2020.01); *G01S 2007/027* (2013.01); *G01S 2013/93271* (2020.01); *G01S 2013/93275* (2020.01)

(56) References Cited

U.S. PATENT DOCUMENTS

| | | | | |
|---|---|---|---|---|
| 9,194,725 | B2 * | 11/2015 | Kaufmann | ............ G01S 15/931 |
| 2006/0266939 | A1 * | 11/2006 | Michiyama | ............... G01J 1/04 |
| | | | | 250/239 |
| 2019/0329737 | A1 * | 10/2019 | Bretagnol | .............. G02B 5/208 |

FOREIGN PATENT DOCUMENTS

| | | |
|---|---|---|
| JP | 2003-054339 | 2/2003 |
| JP | 2003-202379 | 7/2003 |
| JP | 2004-317507 | 11/2004 |
| JP | 2009-300390 | 12/2009 |
| JP | 2015-025696 | 2/2015 |
| WO | 2018/051906 | 3/2018 |

OTHER PUBLICATIONS

Japanese Decision of Rejection for Japanese Patent Application No. 2018-006333 dated Oct. 1, 2019.

\* cited by examiner

VEHICLE OUTSIDE SENSOR UNIT

CROSS-REFERENCE TO RELATED APPLICATION

Priority is claimed on Japanese Patent Application No. 2018-006333, filed on Jan. 18, 2018, the contents of which are incorporated herein by reference.

BACKGROUND

Field of the Invention

The present invention relates to a vehicle outside sensor unit that includes an outside sensor such as a millimeter-wave radar.

Background

Recently, drive assist systems such as an automatic brake system have been implemented. An outside sensor such as a millimeter-wave radar that monitors a situation around a vehicle is used for the drive assist systems. In such a system, in order to secure a detection accuracy of the outside sensor, it is important to provide a detection surface of the outside sensor toward an appropriate direction of the vehicle.

Therefore, an outside sensor that is capable of adjusting a direction of a detection surface has been proposed (for example, refer to Japanese Patent Application, Publication No. 2004-317507A).

SUMMARY

In an outside sensor, it is effective to provide a mechanism for adjusting a direction of a detection surface. However, in that case, when a cover member that covers a circumference of a detection direction is attached to the outside sensor, the cover member is displaced in association with the adjustment of the direction of the outside sensor. Therefore, an external appearance may be degraded.

An aspect of the present invention provides a vehicle outside sensor unit capable of adjusting a direction of an outside sensor without degrading an external appearance.

A vehicle outside sensor unit according to an aspect of the present invention includes: an outside sensor that detects a situation around a vehicle; a main bracket that is attached to a vehicle body; a support bracket that supports the outside sensor and that is attached to the main bracket rotatably adjustably; and a cover member that covers an outer circumference in an outside detection direction of the outside sensor, wherein the main bracket has: a base wall that is attached to the support bracket rotatably adjustably; and an attachment seat that is arranged at a position which is offset in the outside detection direction of the outside sensor with respect to the base wall, and the cover member is attached to the attachment seat.

According to the configuration described above, even when the direction of the outside sensor is adjusted, the cover member is maintained to be positionally fixed to the main bracket. Therefore, the degradation of the appearance due to the displacement of the cover member does not occur.

The cover member may be formed of a plastic material, and the cover member may be attached to the attachment seat by a latch part made of a plastic.

In this case, the cover member is a lightweight component made of a plastic, and therefore, the cover member can be stably supported by the attachment seat using the latch part made of a plastic. The latch part is a plastic component, and therefore, fabrication and attachment are facilitated. Accordingly, when this configuration is employed, it is possible to reduce a product cost and reduce the weight of the vehicle.

The latch part may be attached to or be formed integrally with the cover member, and a latch hole to which the latch part is inserted and latched may be provided on the attachment seat.

In this case, by only pushing the latch part that is made of a plastic and that is integrated with the cover member into the latch hole of the attachment seat, the cover member is able to be easily attached to the attachment seat. Accordingly, when this configuration is employed, an assembly work of the cover member is facilitated.

The cover member may be formed so as to cover a gap between an opening of a bumper face of the vehicle and an outer circumferential area of the outside sensor.

In this case, the gap between the opening of the bumper face and the outside sensor is covered by the cover member, and it is possible to obtain a good appearance.

An operation part of a positioning fixation member that fixes a relative rotation position between the support bracket and the main bracket may be arranged on the support bracket at a surface that faces the outside detection direction of the outside sensor, and the attachment seat of the main bracket may be arranged at a position that is not overlapped with the operation part when seen from the outside detection direction of the outside sensor.

In this case, before the cover member is attached to the attachment seat of the main bracket, the support bracket is appropriately rotated relative to the main bracket, and the direction of the outside sensor is adjusted. Then, the relative rotation position between the support bracket and the main bracket is fixed by the positioning fixation member. At this time, although the operation part of the positioning fixation member is operated by inserting a tool from the outside direction of the outside sensor, the attachment seat of the main bracket is arranged at a position that is out of an insertion pathway of the tool. Therefore, it is possible to smoothly perform an operation of the positioning fixation member by the tool. After that, the cover member is attached to the attachment seat.

According to an aspect of the present invention, the cover member is attached to the attachment seat that is provided on the main bracket, and therefore, even when the direction of the outside sensor is adjusted, the cover member is not displaced. Therefore, according to an aspect of the present invention, it is possible to adjust the direction of the outside sensor without degrading the external appearance.

DESCRIPTION OF THE EMBODIMENTS

Hereinafter, one embodiment of the present invention will be described with reference to the drawings.

Figure 1:
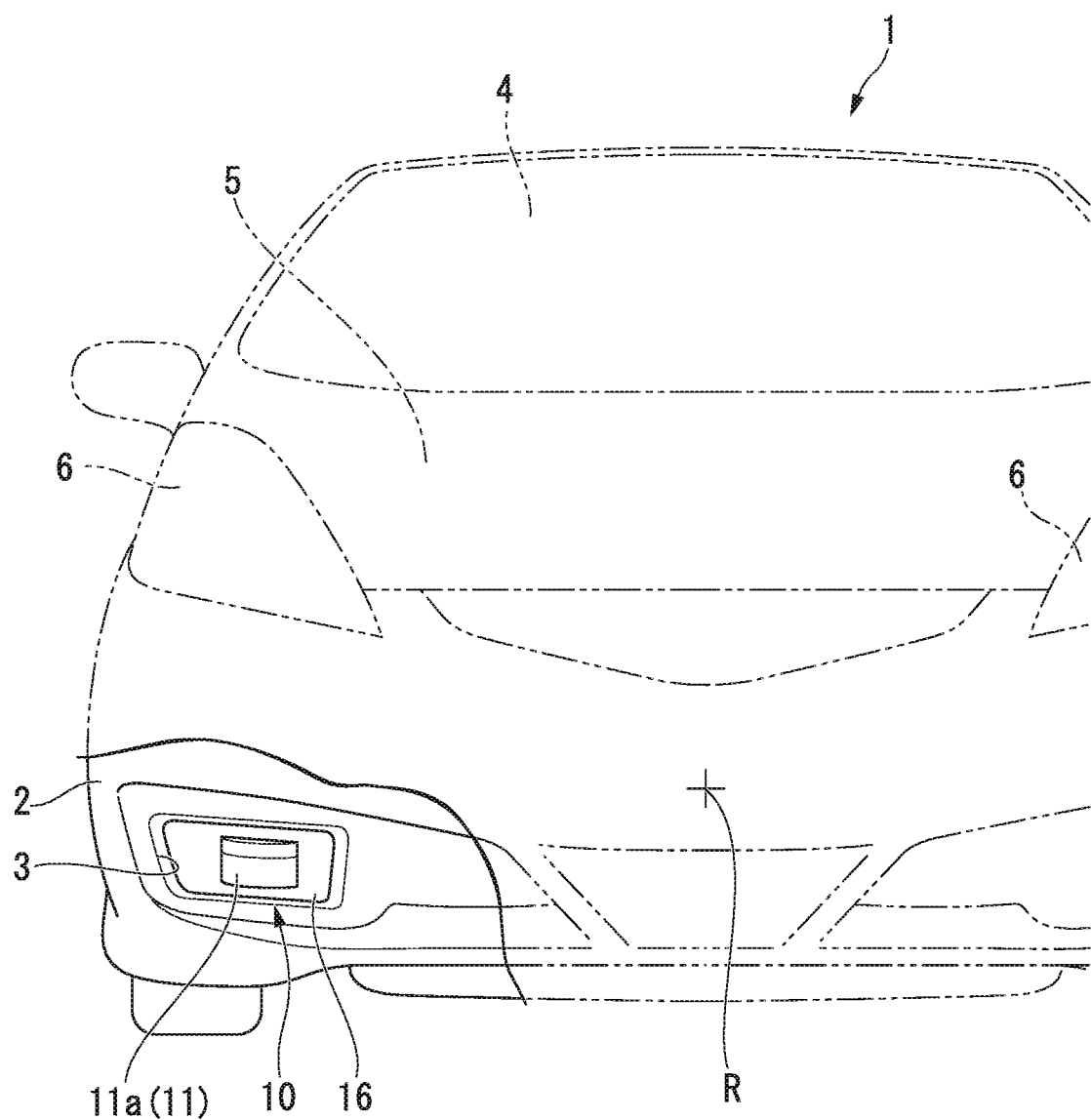
FIG. 1 is a front view of a vehicle to which an outside sensor unit is attached according to an embodiment of the present invention.

FIG. 1 is a schematic front view of a vehicle 1 to which an outside sensor unit 10 is attached according to the present embodiment.

The outside sensor unit 10 is disposed on each of right and left side edge portions of a vehicle body front lower part.

In FIG. 1, only an outside sensor unit 10 that is disposed on the right front part of the vehicle is shown. An outside sensor unit 10 is similarly disposed also on the left front part of the vehicle. The outside sensor unit 10 is attached to a frame member (not shown) of the vehicle body via a main bracket 12 (refer to FIG. 2 to FIG. 6) described below. An opening 3 having a substantially rectangle shape elongated in a lateral direction is formed on right and left lower edges of a bumper face 2 of a front bumper of a vehicle 1. The outside sensor unit 10 is disposed at a rearward position of the opening 3 of the bumper face 2.

In FIG. 1, a front windshield glass 4 at a frontward position of a front seat of the vehicle 1, an engine hood 5, and a headlight 6 are shown.

Figure 2:
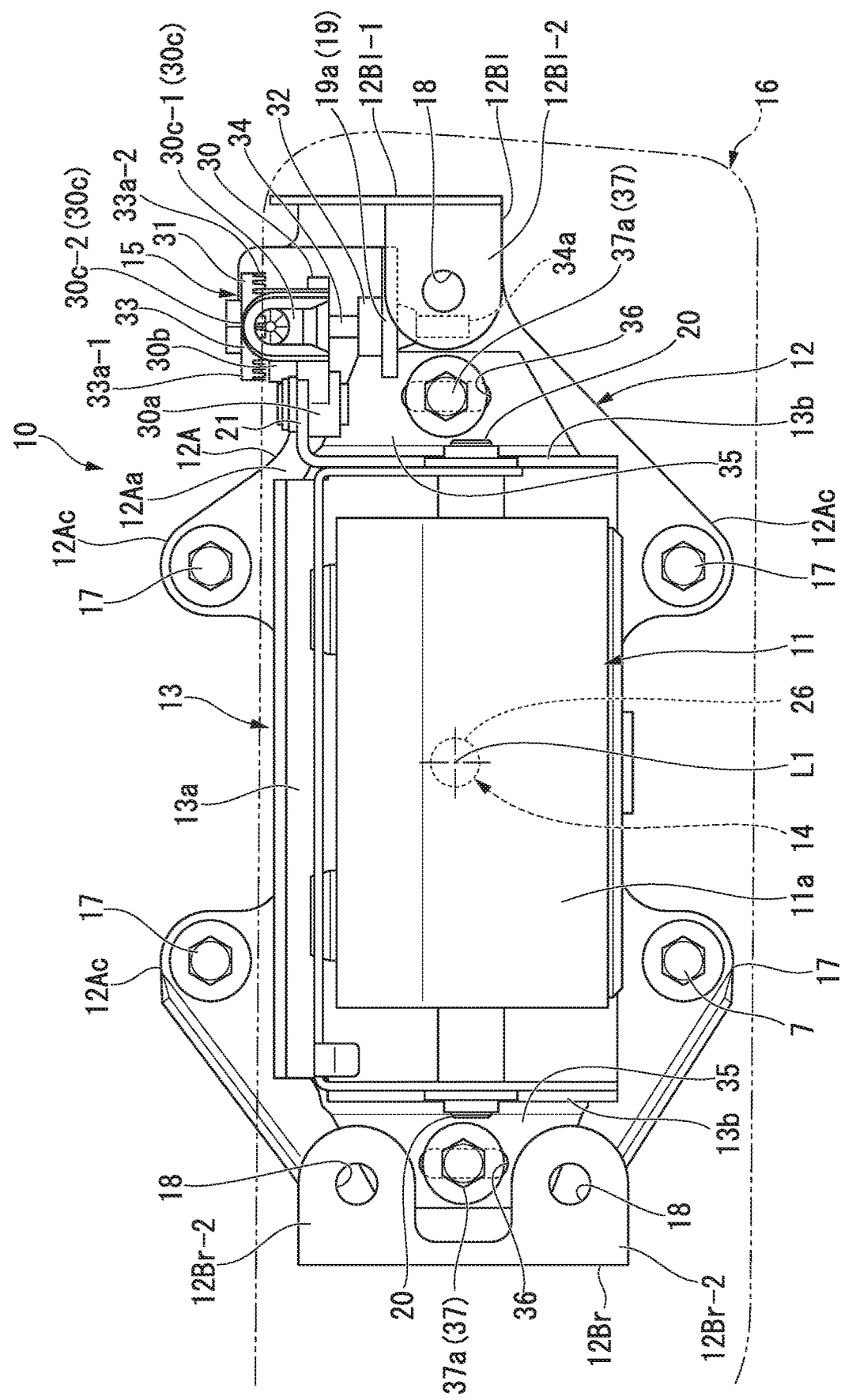
FIG. 2 is a front view of the outside sensor unit according to the embodiment of the present invention.
Figure 3:
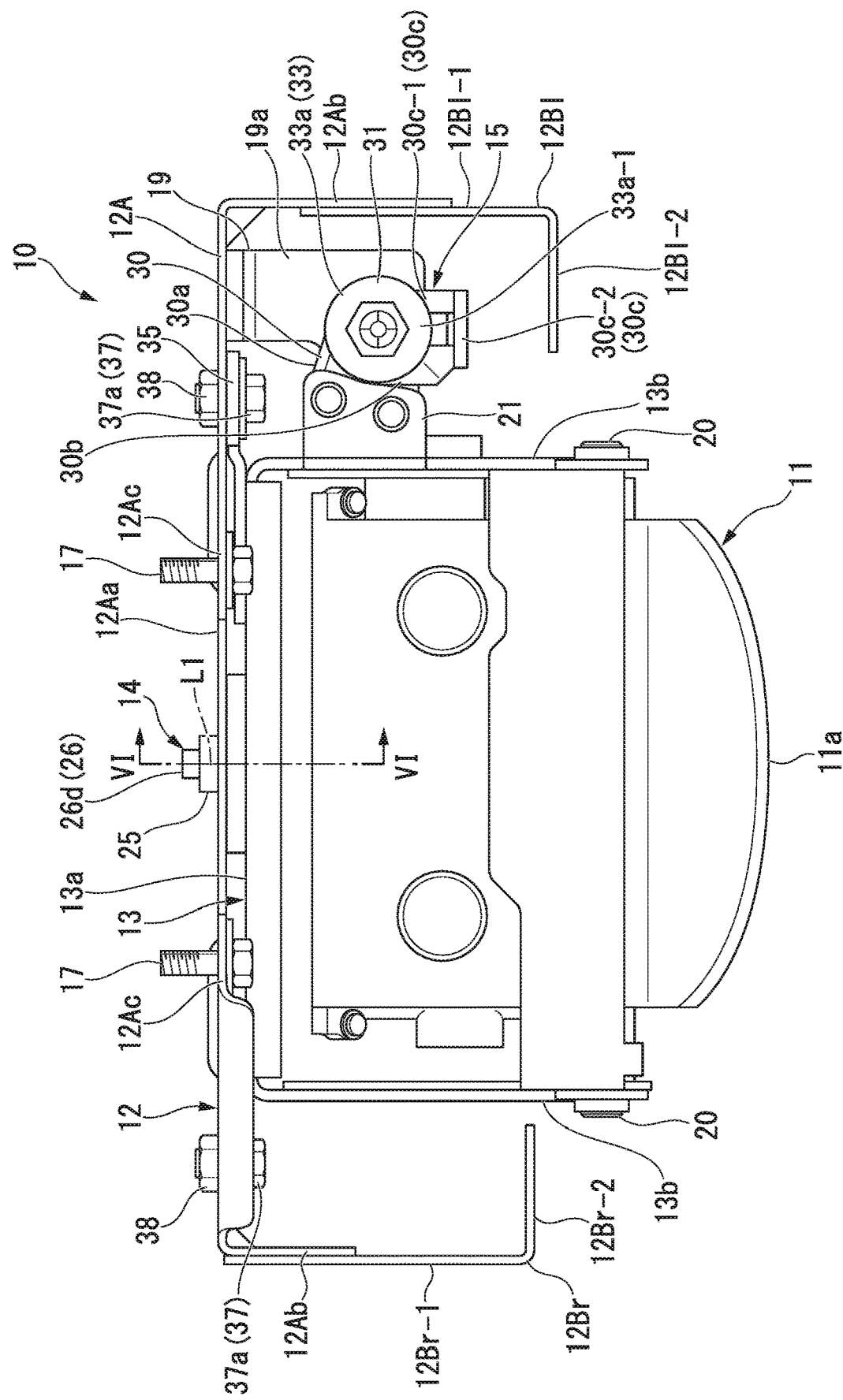
FIG. 3 is a top view of the outside sensor unit according to the embodiment of the present invention.
Figure 4:
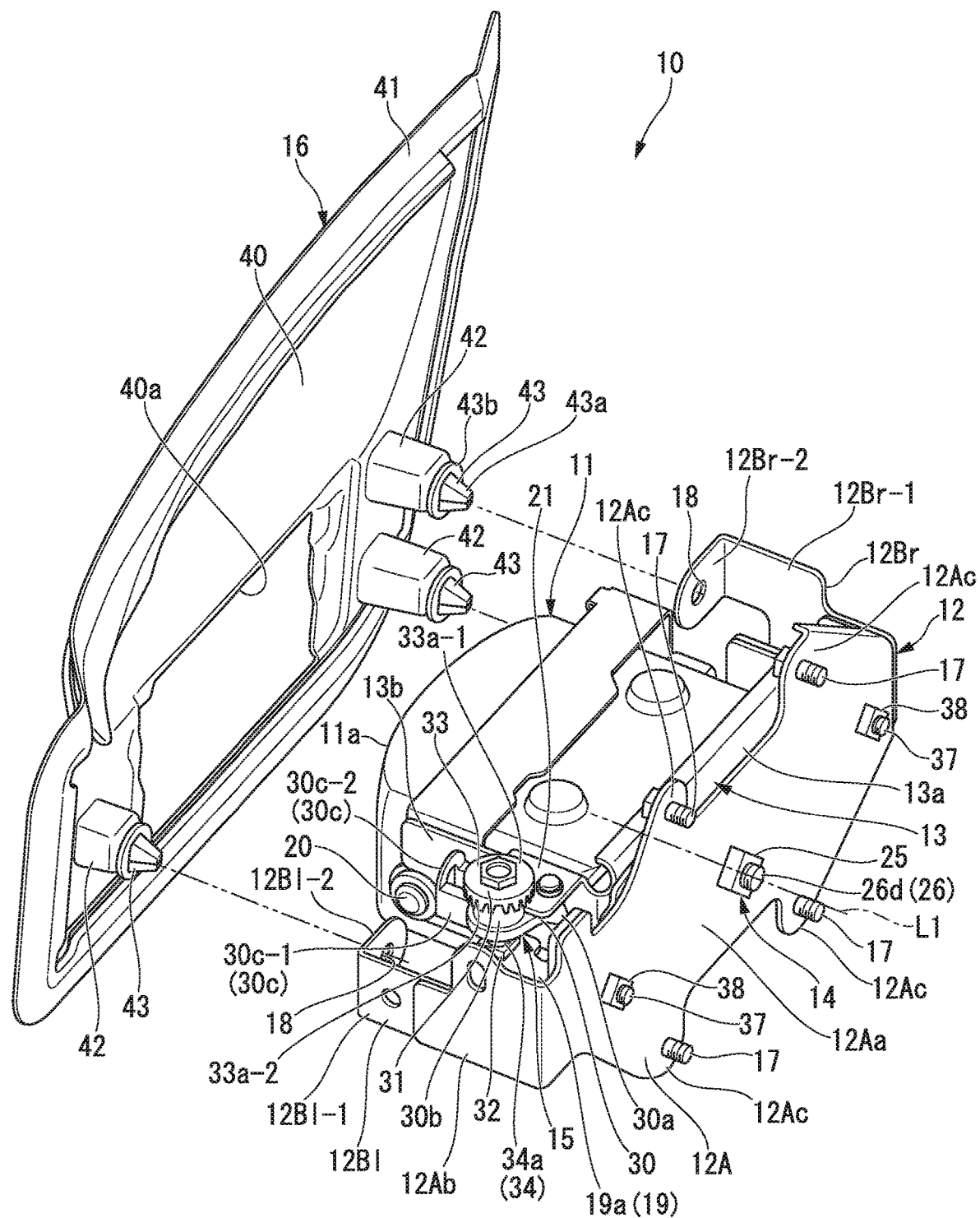
FIG. 4 is an exploded perspective view of the outside sensor unit according to the embodiment of the present invention.
Figure 5:
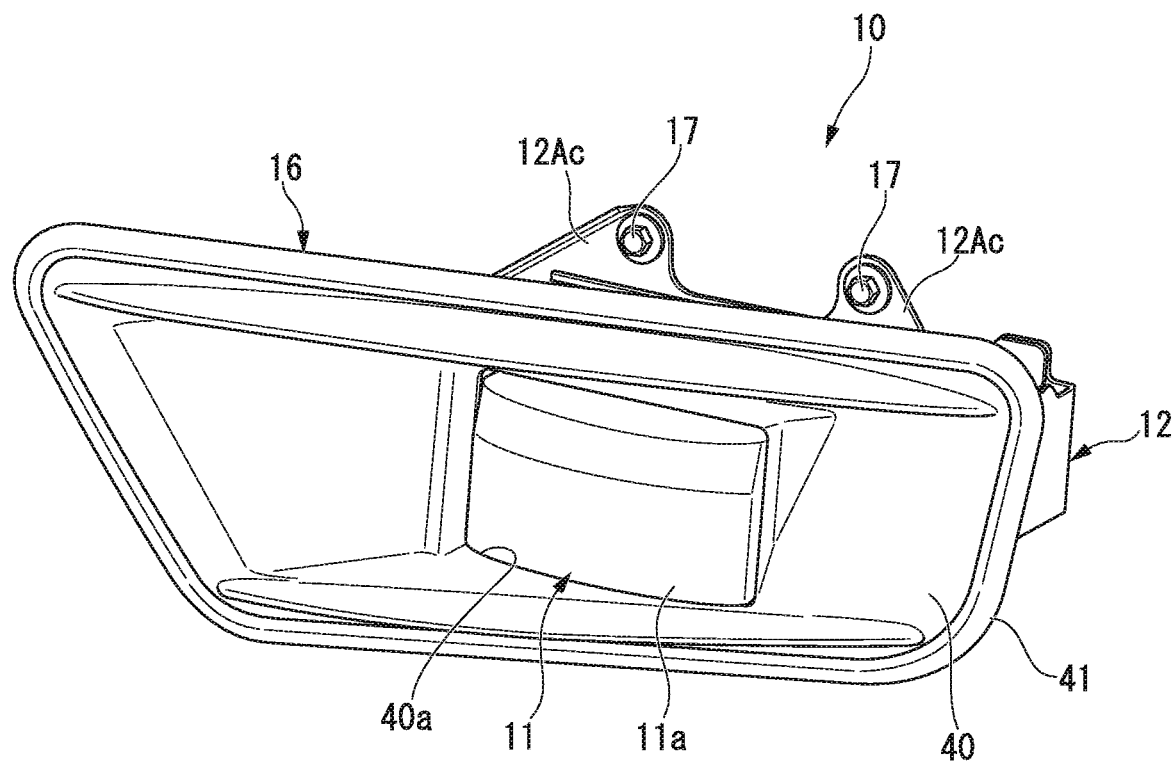
FIG. 5 is a perspective view of the outside sensor unit according to the embodiment of the present invention.

FIG. 2 is a view of the outside sensor unit 10 from which part of components are removed when seen from a frontward direction. FIG. 3 is a view of the outside sensor unit 10 from which part of components are removed when seen from an upward direction. FIG. 4 is a view in which part of the outside sensor unit 10 is disassembled when seen from a rearward, leftward, and diagonally upward direction. FIG. 5 is a view of the outside sensor unit 10 when seen from a frontward and diagonally upward direction. The upside, downside, right, left, front, and rear in the following description of the structure of the outside sensor unit 10 mean the upside, downside, right, left, front, and rear in a state where a structure element is attached to the vehicle body.

The outside sensor unit 10 includes: an outside sensor 11 that detects a frontward state (a situation around a vehicle) of the vehicle; the main bracket 12 and a support bracket 13 for attaching the outside sensor 11 to the vehicle body; a rotation mechanism 14 that rotatably connects the support bracket 13 and the main bracket 12 together; a position adjustment mechanism 15 that adjusts a relative rotation position between the support bracket 13 and the main bracket 12; and a cover member 16 that covers the circumference of the front part side of the outside sensor 11.

The outside sensor 11 includes a main body part having a cuboid shape, and a front surface of the main body part is an outside detection surface 11a. The outside sensor 11 can be constituted of, for example, a millimeter-wave radar, a laser radar, an ultrasonic sensor, a sonar, an optical camera, and the like. In the present embodiment, a millimeter-wave radar is employed as the outside sensor 11.

The main bracket 12 includes: a base plate 12A made of a metal and having a substantially U shape in a top view; and a pair of supplement plates 12Bl, 12Br made of a metal and having a substantially L shape in a top view. Each of the supplement plates 12Bl, 12Br is fixed by welding to the base plate 12A. The base plate 12A includes: a base wall 12Aa that faces the vehicle frontward direction in a state of being attached to the vehicle body; and a joint wall 12Ab that extends toward the vehicle frontward direction from each of right and left end parts of the base wall 12Aa. A pair of fastening flanges 12Ac is provided to extend on each of upper and lower sides of the base wall 12Aa. Each of fastening flanges 12Ac is fixed to a frame member (not shown) of the vehicle body by a bolt 17 as a fastening member.

A fixation bracket 19 having a substantially L shape for fixing the position adjustment mechanism 15 described later is attached to a left side edge part of the base wall 12Aa. The fixation bracket 19 includes an extension wall 19a that extends substantially horizontally frontward from the front surface of the base wall 12Aa.

The left supplement plate 12Bl has: a base wall 12Bl-1 that is fixed by welding to the left joint wall 12Ab of the base plate 12A; and a bent wall 12Bl-2 that is bent inward in the width direction from the base wall 12Bl-1. The right supplement plate 12Br has: a base wall 12Br-1 that is fixed by welding to the right joint wall 12Ab of the base plate 12A; and a bent wall 12Br-2 that is bent inward in the width direction from the base wall 12Br-1. The width in the vertical direction of the left supplement plate 12Bl is about half of the width in the vertical direction of the right supplement plate 12Br. A latch hole 18 having a circular shape is formed on the bent wall 12Bl-2 of the left supplement plate 12Bl. Two bent walls 12Br-2 of the right supplement plate 12Br are provided on the base wall 12Br-1 so as to be spaced by a predetermined distance in the vertical direction from each other. A latch hole 18 having a circular shape is formed also on each of the bent walls 12Br-2. The bent walls 12Bl-2, 12Br-2 of the left and right supplement plates 12Bl, 12Br constitute an attachment seat to which the cover member 16 described below is attached.

The support bracket 13 is formed of a plate material that is made of a metal and that has a substantially U shape in a top view. The support bracket 13 has: a base wall 13a that faces the vehicle frontward direction in a state of being attached to the vehicle body; and a support wall 13b that extends toward the vehicle frontward direction from each of right and left end parts of the base wall 13a. The base wall 13a of the support bracket 13 is arranged to face the front surface of the base wall 12Aa of the main bracket 12 and is rotatably connected to the base wall 12Aa of the main bracket 12 via the rotation mechanism 14. The main body part of the outside sensor 11 is arranged between the right and left support walls 13b. The main body part of the outside sensor 11 is fixed to the right and left support walls 13b of the support bracket 13 via a bolt 20 as a fastening member and the like.

A fixation wall 21 that extends substantially horizontally toward the left side direction is provided on the left support wall 13b at an upper part close to the base wall 13a. The position adjustment mechanism 15 described below is fixed to the fixation wall 21.

Figure 6:
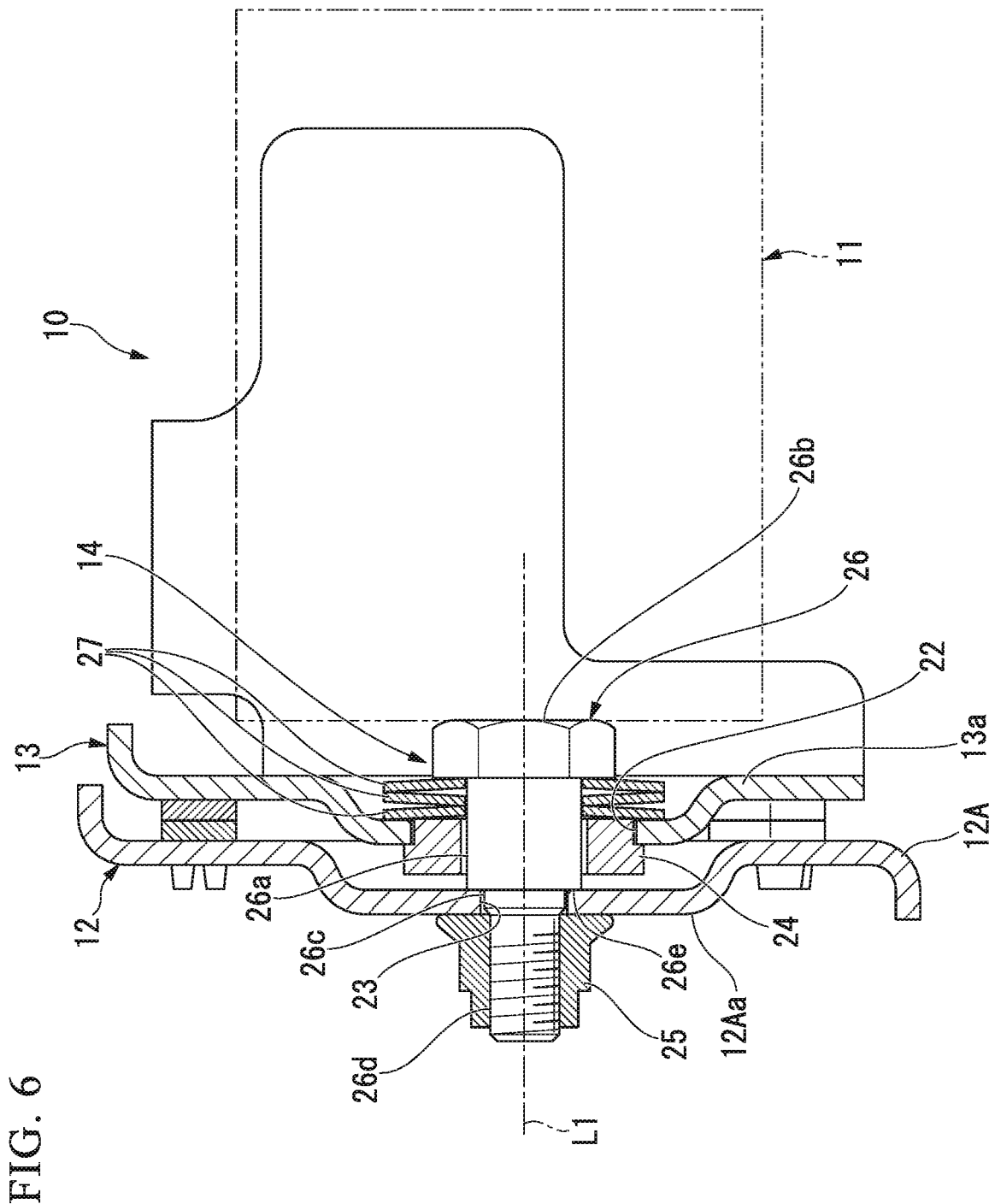
FIG. 6 is a cross-sectional view along a VI-VI line of FIG. 3 of the outside sensor unit according to the embodiment of the present invention.

FIG. 6 is a view showing a cross-section along a VI-VI line of FIG. 3 of the outside sensor unit 10.

As shown in FIG. 6, a first penetration hole 22 that has a circular shape and that penetrates in the front-to-rear direction (thickness direction) of the base wall 13a is formed on a substantially center part of the base wall 13a of the support bracket 13. A bearing ring 24 is attached to an inner circumferential part of the first penetration hole 22.

A second penetration hole 23 that has a circular shape and that penetrates in the front-to-rear direction (thickness direction) of the base wall 12Aa is formed on a substantially center part of the base wall 12Aa of the main bracket 12. The second penetration hole 23 is formed to have a smaller diameter than the first penetration hole 22. A weld nut 25 is provided on the rear surface of the base wall 12Aa of the main bracket 12 at a position that surrounds the second penetration hole 23. A shaft part of a support bolt 26 is inserted from the front side of the support bracket 13 through the first penetration hole 22 and the second penetration hole 23.

The support bolt 26 has: a large diameter shaft part 26a; a head part 26b that is provided to continue to one end of the large diameter shaft part 26a; a small diameter shaft part 26c that is provided to continue to the other end of the large diameter shaft part 26a; and a male screw part 26d that is provided to continue to an end part of the small diameter shaft part 26c at the opposite side of the large diameter shaft part 26a. The large diameter shaft part 26a, the small diameter shaft part 26c, and the male screw part 26d are concentrically formed. The large diameter shaft part 26a is fitted rotatably to an inner part of the bearing ring 24 that is attached to the first penetration hole 22. The small diameter shaft part 26c is fitted to the second penetration hole 23. The male screw part 26d is fastened to the weld nut 25.

When the male screw part 26d of the support bolt 26 is fastened to the weld nut 25, a circumferential edge part of the second penetration hole 23 is sandwiched between the weld nut 25 and a step part 26e between the large diameter shaft part 26a and the small diameter shaft part 26c. As a result, the support bolt 26 is fixed to the base wall 12Aa of the main bracket 12. In this state, the support bracket 13 is connected rotatably to the main bracket 12 via the bearing ring 24 and the large diameter shaft part 26a of the support bolt 26. The support bolt 26 (the large diameter shaft part 26a and the small diameter shaft part 26c) that connects the support bracket 13 and the main bracket 12 together is positioned at a rear side (a side opposite to the detection direction of the outside sensor 11) of the outside sensor 11.

A plurality of disk springs 27 as a bias member are provided between the head part 26b of the support bolt 26 and the front surface of the base wall 13a of the support bracket 13. The disk spring 27 gives a rotation resistance between the main bracket 12 and the support bracket 13.

In the present embodiment, the support bolt 26, the first penetration hole 22, the second penetration hole 23, the bearing ring 24, the weld nut 25, the disk spring 27, and the like constitute the rotation mechanism 14. The large diameter shaft part 26a and the small diameter shaft part 26c of the support bolt 26 constitute a rotation shaft of the rotation mechanism 14. A center axis line of the large diameter shaft part 26a and the small diameter shaft part 26c of the support bolt 26 constitute a rotation axis line L1 of the rotation mechanism 14 that is substantially parallel to a roll axis R (refer to FIG. 1) of the vehicle. The rotation mechanism 14 enables a relative rotation of the support bracket 13 and the main bracket 12 around the rotation axis line L1.

The position adjustment mechanism 15 adjusts a relative rotation position between the support bracket 13 and the main bracket 12 around the rotation axis line L1. Thereby, the slant angle in a vehicle roll direction of the outside detection surface 11a of the outside sensor 11 is adjusted.

In a case of the millimeter-wave radar, the laser radar, the ultrasonic sensor, and the sonar, for example, the "outside detection surface" refers to a transmission reception plane of outside detection waves. In a case of the optical camera, a lens surface of an objective lens corresponds to the "outside detection surface".

The position adjustment mechanism 15 includes: a base member 30 that is attached to the fixation wall 21 of the support bracket 13; a male screw member 31 that is rotatably supported by the base member 30; and a female screw member 32 that is attached to the extension wall 19a of the main bracket 12.

The base member 30 has: a fixation part 30a that is fastened by a bolt to the fixation wall 21 of the support bracket 13; a support part 30b that rotatably supports the male screw member 31; and a guide part 30c that guides an insertion of a tool for operating the male screw member 31 to be rotated (for rotating the male screw member 31 and the female screw member 32 relative to each other). The fixation part 30a, the support part 30b, and the guide part 30c are integrally formed of a plastic.

The fixation part 30a is a block that has a plate shape and that is overlapped on a lower surface of the fixation wall 21. The support part 30b is provided to continue to one side of the fixation part 30a. The support part 30b is a block having a substantially tube shape. The central axis line of the support part 30b is directed substantially in the vertical direction. A shaft part of the male screw member 31 is supported rotatably on an inner side of the tube shape portion of the support part 30b. The guide part 30c is provided to continue to a front part of the support part 30b. The guide part 30c includes: a base guide wall 30c-1 that has a substantially U shape in a cross-section and that extends frontward from the support part 30b; and a displacement regulation wall 30c-2 that has an inverted U shape in a cross section and that is connected to continue to a front end part of the base guide wall 30c-1.

In the present embodiment, it is assumed that the operation tool which is inserted in the guide part 30c is a Phillips screwdriver having a convergent front end part. The front end part of the Phillips screwdriver is inserted in the guide part 30c from the front direction along the front-to-rear direction. A reception part shape that is opened upward and that receives a lower half part of the Phillips screwdriver is formed on the base guide wall 30c-1. The reception part shape on a rear end side of the base guide wall 30c-1 is formed in a taper shape substantially along the front end part shape of the Phillips screwdriver. The displacement regulation wall 30c-2 regulates an upward displacement of the base part of the Phillips screwdriver when the front end part of the Phillips screwdriver is inserted in the reception part of the base guide wall 30c-1.

In the present embodiment, the base guide wall 30c-1 and the displacement regulation wall 30c-2 of the guide part 30c constitute a tool insertion opening in which the tool (Phillips screwdriver) is inserted. The tool insertion opening is opened toward the outside detection direction (vehicle frontward direction) of the outside sensor 11.

The male screw member 31 is formed by insert molding in which a bolt part 34 made of a metal is inserted in an operation part 33 made of a plastic and is molded. The operation part 33 and the bolt part 34 are formed concentrically. A head portion side of the bolt part 34 is integrally joined to the operation part 33. The bolt part 34 has a shaft portion 34a that extends from the head portion, and a male screw is formed on the shaft portion 34a. The operation part 33 has: a tubular wall (not shown) that is supported rotatably by the support part 30b of the base member 30; and a gear portion 33a that is provided to continue to an end part of the tubular wall. The operation part 33 is supported by the base member 30, and thereby, the rotation axis line of the male screw member 31 is directed in the vertical direction.

The gear portion 33a forms a crown gear shape in which a plurality of teeth 33a-2 are provided on one surface of a circular plate section 33a-1 so as to protrude and be arranged in an annular form. The plurality of teeth 33a-2 of the gear portion 33a are provided to protrude downward and face an upper part on the base side of the base guide wall 30c-1 of the base member 30. The front end part of the Phillips screwdriver (tool) that is inserted in the reception part of the base guide wall 30c-1 is engaged with the teeth 33a-2 of the gear portion 33a. When the Phillips screwdriver (tool) is operated to be rotated in this state, the entire male screw member 31 is rotated around the rotation axis line via the gear part 33a.

The female screw member 32 is constituted of a plastic member having a substantially tubular shape and is attached to an attachment hole (not shown) that is formed on the extension wall 19a of the main bracket 12. The female screw member 32 has a clip latch structure and is latched in a state of being fitted in the attachment hole. A female screw is formed on an inner surface of the tubular shape part of the female screw member 32. The male screw of the shaft portion 34a of the male screw member 31 is screwed to the female screw of the female screw member 32.

The male screw member 31 that is attached to the support bracket 13 via the base member 30 is arranged at a position that is spaced in a radial direction from the rotation axis line L1 of the rotation mechanism 14. Similarly, the female screw member 32 that is attached to the main bracket 12 is arranged at a position that is spaced in the radial direction from the rotation axis line L1 of the rotation mechanism 14. Therefore, when the male screw member 31 is operated to be rotated by the above-described Phillips screwdriver or the like, the separation distance between the female screw member 32 and the head part side of the male screw member 31 is changed. As a result, the slant angle of the support bracket 13 relative to the main bracket 12 is changed, and the slant angle in the vehicle roll direction of the outside sensor 11 is adjusted.

As shown in FIG. 2 and FIG. 3, a fixation plate 35 that extends in the lateral direction is integrally joined to right and left side edge parts of the base wall 13a of the support bracket 13. An elongated hole 36 which has a substantially arc shape and of which the center is the rotation axis line L1 is formed on each fixation plate 35. A fixation bolt 37 is inserted through each elongated hole 36. A penetration hole (not shown) and a weld nut 38 (refer to FIG. 3 and FIG. 4) are provided on the base wall 12Aa of the main bracket 12 in a region that corresponds to the elongated hole 36 of each fixation plate 35. The fixation bolt 37 is screwed in the weld nut 38 on the main bracket 12 side in a state of penetrating through the elongated hole 36 after the slant angle of the support bracket 13 is adjusted by the position adjustment mechanism 15. Thereby, the slant angle of the support bracket 13 relative to the main bracket 12 is fixed, and, as a result, the slant angle in the vehicle roll direction of the outside sensor 11 is also fixed.

In the present embodiment, the fixation bolt 37 constitutes a positioning fixation member that fixes the relative rotation position between the support bracket 13 and the main bracket 12. A head part 37a of the fixation bolt 37 constitutes an operation part of the positioning fixation member.

Each of the left and right bent walls 12Bl-2, 12Br-2 (attachment seat) that are arranged to be offset in the frontward direction (the outside detection direction of the outside sensor 11) with respect to the base wall 12Aa of the main bracket 12 is arranged at a position that is not overlapped with the head part 37a (operation part) of the fixation bolt 37 when seen from the vehicle frontward direction (from the outside detection direction). Specifically, the left bent wall 12Bl-2 is arranged at a left outer position of the head part 37a of the left fixation bolt 37, and each of the right two bent walls 12Br-2 is arranged at each of upper and lower positions of the head part 37a of the right fixation bolt 37.

As shown in FIG. 4 and FIG. 5, the cover member 16 that is attached to the bent walls 12Bl-2, 12Br-2 (attachment seat) of the main bracket 12 is formed in a horizontally elongated substantially rectangular shape. The cover member 16 is formed so as to cover a gap between the opening 3 of the bumper face 2 of the vehicle and an outer circumferential region of the outside sensor 11. The cover member 16 covers the support bracket 13 and the position adjustment mechanism 15 from the vehicle frontward direction (from the outside detection direction of the outside sensor 11) and prevents the support bracket 13 and the position adjustment mechanism 15 from being seen from the vehicle frontward direction.

The cover member 16 includes: a cover main body 40 having an opening part 40a at a center part; and a frame member 41 that is attached to an outer circumferential edge part of the cover main body 40. The cover main body 40 is formed of a hard plastic material in a horizontally elongated substantially rectangular shape in a front view. The outside detection surface 11a of the outside sensor 11 is exposed toward the vehicle frontward direction from the opening part 40a of the cover main body 40. The front surface of the cover main body 40 is formed to be hollowed in a recess shape from the outer circumferential edge part toward the opening part 40a. The frame member 41 is formed of a soft plastic material. A soft plastic material similar to the frame member 41 may be also arranged between the outside sensor 11 and the opening part 40a of the cover main body 40.

A boss part 42 is provided to protrude on the rear surface of the cover main body 40 at each of positions that correspond to the bent walls 12Bl-2, 12Br-2 (attachment seat) of the main bracket 12. A latch portion 43 made of a plastic is provided on a front end portion of each boss part 42. The latch portion 43 may be integrally formed on the boss part 42. Alternatively, the latch portion 43 may be formed as a separate component and be attached to the boss part 42. The latch portion 43 has: a guide protrusion 43a that is convergent toward the front end side; and a latch flange 43b that is provided to continue to the base part of the guide protrusion 43a. Each latch portion 43 is inserted in the corresponding latch hole 18 of the bent walls 12Bl-2, 12Br-2 and is latched. After the guide protrusion 43a is inserted in the latch hole 18 first, by pushing each latch portion 43 rearward in that state, the latch flange 43b is deformed, and each latch portion 43 is inserted in the latch hole 18. The latch flange 43b passes through the latch hole 18, and thereby, the latch portion 43 is stopped by an edge part of the latch hole 18. Each latch portion 43 is latched by the corresponding latch hole 18, and thereby, the cover member 16 is fixed to the main bracket 12.

In the outside sensor unit 10 of the present embodiment, the slant angle in the vehicle roll direction of the outside sensor 11 is adjusted as described below.

The cover member 16 is not attached to the main bracket 12 and is in a state of being detached from the vehicle body. In this state, the outside sensor 11, the support bracket 13, and the position adjustment mechanism 15 are exposed toward the vehicle frontward direction through the opening 3 of the bumper face 2. In this state, the tool is inserted in the opening 3 of the bumper face 2, the fixation bolt 37 is loosened by the tool, and the fixation of rotation of the position adjustment mechanism 15 is released.

Next, while performing inspection of the detection range of the outside sensor 11 that is attached to the vehicle, the Phillips screwdriver is inserted in the guide part 30c of the position adjustment mechanism 15, and the male screw member 31 of the position adjustment mechanism 15 is rotated by the Phillips screwdriver. Thereby, the support bracket 13 is rotated relative to the main bracket 12, and the slant angle in the vehicle roll direction of the outside sensor 11 is appropriately adjusted.

Then, the fixation bolt 37 is screwed by the tool, and the rotation position of the support bracket 13 relative to the main bracket 12 is fixed. Further, after that, by arranging the cover member 16 at the opening 3 of the bumper face 2 and pushing the cover member 16 by hand, each latch portion 43 of the cover member 16 is fitted into the corresponding latch hole 18 of the main bracket 12. As a result, the cover member 16 is attached so as to cover the gap between the outside sensor 11 and the opening 3 of the bumper face 2.

As described above, in the outside sensor unit 10 of the present embodiment, the cover member 16 is attached to the bent walls 12Bl-2, 12Br-2 (attachment seat) that are provided on the main bracket 12, and therefore, even when the direction of the outside sensor 11 is adjusted, the cover member 16 is not displaced. Accordingly, when the outside sensor unit 10 of the present embodiment is employed, it is possible to adjust the direction of the outside sensor 11 without degrading the external appearance.

Further, in the outside sensor unit 10 of the present embodiment, the cover member 16 is formed of a plastic material, and the cover member 16 is attached to the bent walls 12Bl-2, 12Br-2 (attachment seat) of the main bracket 12 by the latch portion 43 (latch part) made of a plastic. In this case, since the cover member 16 is made of a plastic and is lightweight, even when the latch portion 43 is made of a plastic, it is possible to stably support the cover member 16 by the bent walls 12Bl-2, 12Br-2 (attachment seat). Accordingly, when this configuration is employed, it is possible to reduce a product cost and reduce the weight of the vehicle.

Further, the outside sensor unit 10 of the present embodiment has a structure in which the latch portion 43 made of a plastic is provided integrally with the cover member 16, and the latch portion 43 is inserted to the latch hole 18 and is latched by the bent walls 12Bl-2, 12Br-2 (attachment seat). Therefore, by only pushing the latch portion 43 that is made of a plastic and that is integrated with the cover member 16 into the latch hole 18, the cover member 16 is able to be easily attached to the bent walls 12Bl-2, 12Br-2 (attachment seat). Accordingly, when this configuration is employed, an assembly work of the cover member 16 is facilitated.

Further, in the outside sensor unit 10 of the present embodiment, the cover member 16 is formed so as to cover the gap between the opening 3 of the bumper face 2 of the vehicle and the outer circumferential area of the outside sensor 11.

Accordingly, the gap between the opening 3 of the bumper face 2 and the outside sensor 11 is covered by the cover member 16, and it is possible to obtain a good appearance of the vehicle.

Further, in the outside sensor unit 10 of the present embodiment, the head part 37*a* (operation part) of the fixation bolt 37 that fixes the relative rotation position between the support bracket 13 and the main bracket 12 is arranged on a front surface (a surface that faces the outside detection direction of the outside sensor) on the support bracket 13 side, and the bent walls 12Bl-2, 12Br-2 (attachment seat) of the main bracket 12 are arranged at a position that is not overlapped with the head part 37*a* (operation part) of the fixation bolt 37 when seen from the frontward direction (the outside detection direction) of the outside sensor 11. Accordingly, after the slant angle in the vehicle roll direction of the outside sensor 11 is adjusted by the position adjustment mechanism 15, when the fixation bolt 37 is screwed using a tool to fix the relative rotation position between the support bracket 13 and the main bracket 12, it is possible to prevent the tool from interfering with the bent walls 12Bl-2, 12Br-2 (attachment seat) of the main bracket 12. Accordingly, when this configuration is employed, it is possible to smoothly perform the operation of the fixation bolt 37 by the tool.

The invention is not limited to the embodiment described above, and a variety of design changes can be made without departing from the scope of the invention. For example, the above embodiment is described using an example in which the outside sensor unit 10 is disposed at right and left positions of the front bumper of the vehicle; however, the outside sensor unit 10 may be disposed at right and left positions of the rear bumper. Further, the outside sensor unit 10 may be disposed at a part other than the bumper such as a front grille of the vehicle.

What is claimed is:

1. A vehicle outside sensor unit, comprising:
   an outside sensor that detects a situation around a vehicle;
   a main bracket that is attached to a vehicle body;
   a support bracket that supports the outside sensor and that is attached to the main bracket rotatably adjustably; and
   a cover member that covers an outer circumference in an outside detection direction of the outside sensor,
   wherein the main bracket has:
   a base wall that is attached to the support bracket rotatably adjustably; and
   an attachment seat that is arranged at a position which is offset in the outside detection direction of the outside sensor with respect to the base wall, and
   the cover member is attached to the attachment seat.

2. The vehicle outside sensor unit according to claim 1, wherein the cover member is formed of a plastic material, and
   the cover member is attached to the attachment seat by a latch part made of a plastic.

3. The vehicle outside sensor unit according to claim 2, wherein the latch part is attached to or is formed integrally with the cover member, and
   a latch hole to which the latch part is inserted and latched is provided on the attachment seat.

4. The vehicle outside sensor unit according to claim 1, wherein the cover member is formed so as to cover a gap between an opening of a bumper face of the vehicle and an outer circumferential area of the outside sensor.

5. The vehicle outside sensor unit according to claim 1, wherein an operation part of a positioning fixation member that fixes a relative rotation position between the support bracket and the main bracket is arranged on the support bracket at a surface that faces the outside detection direction of the outside sensor, and
   the attachment seat of the main bracket is arranged at a position that is not overlapped with the operation part when seen from the outside detection direction of the outside sensor.

* * * * *